United States Patent
Bailey et al.

(10) Patent No.: US 10,448,089 B2
(45) Date of Patent: Oct. 15, 2019

(54) LOW NOISE NETWORK INTERFACE DEVICE

(71) Applicant: PPC Broadband, Inc., East Syracuse, NY (US)

(72) Inventors: Paul Bailey, Camillus, NY (US); Yan Li, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 27 days.

(21) Appl. No.: 15/638,789

(22) Filed: Jun. 30, 2017

(65) Prior Publication Data

US 2018/0007425 A1 Jan. 4, 2018

Related U.S. Application Data

(60) Provisional application No. 62/356,860, filed on Jun. 30, 2016.

(51) Int. Cl.
*H04B 10/00* (2013.01)
*H04N 21/436* (2011.01)
(Continued)

(52) U.S. Cl.
CPC ... *H04N 21/43615* (2013.01); *H04L 12/2801* (2013.01); *H04L 12/2834* (2013.01);
(Continued)

(58) Field of Classification Search
CPC .......... H04B 10/2575; H04B 10/25751; H04B 10/25752; H04B 10/25753; H04N 21/61;
(Continued)

(56) References Cited

U.S. PATENT DOCUMENTS 7,974,586 B2 * 7/2011 Romerein ............. H03H 7/463
  455/127.1
8,286,209 B2 * 10/2012 Egan, Jr. ................ H04N 7/104
  725/127
(Continued)

FOREIGN PATENT DOCUMENTS

WO   2016/083356 A1   6/2016

OTHER PUBLICATIONS

Shane Thomas (Authorized Officer), International Search Report and Written Opinion dated Sep. 22, 2017, PCT Application No. PCT/US2017/040234, filed Jun. 30, 2017, pp. 1-10.
(Continued)

*Primary Examiner* — Hanh Phan
(74) *Attorney, Agent, or Firm* — MH2 Technology Law Group LLP

(57) ABSTRACT

The present disclosure provides a network interface device, including an active downstream radio-frequency (RF) signal path connecting an entry port and an active port. The network interface device also includes a passive downstream RF signal path connecting the entry port and a passive port. The network interface device further includes an active upstream RF signal path connecting the entry port and the active port. Additionally, network interface device includes a passive upstream RF signal path connecting the entry port and the passive port. Moreover, the network interface device includes a downstream directional coupler having an input port, a through port, and a coupled port. The passive downstream RF signal path comprises the input port of the downstream directional coupler and the coupled port of the downstream directional coupler.

35 Claims, 2 Drawing Sheets

(51) Int. Cl.
| | |
|---|---|
| *H04L 12/28* | (2006.01) |
| *H04N 7/10* | (2006.01) |
| *H04N 21/2385* | (2011.01) |
| *H04N 21/4363* | (2011.01) |
| *H04N 21/61* | (2011.01) |
| *H04N 21/437* | (2011.01) |
| *H04N 21/438* | (2011.01) |

(52) U.S. Cl.
CPC ...... *H04L 12/2838* (2013.01); *H04L 12/2861* (2013.01); *H04L 12/2898* (2013.01); *H04N 7/102* (2013.01); *H04N 7/104* (2013.01); *H04N 7/106* (2013.01); *H04N 21/2385* (2013.01); *H04N 21/437* (2013.01); *H04N 21/438* (2013.01); *H04N 21/43632* (2013.01); *H04N 21/615* (2013.01)

(58) Field of Classification Search
CPC ........... H04N 21/615; H04N 21/43615; H04N 21/6118; H04N 21/6168; H04N 7/104; H04N 7/102
USPC ... 398/115, 116, 117, 66, 67, 68, 70, 71, 72, 398/100, 58, 135, 136; 725/105, 106, 725/125, 126, 127, 128, 149, 74, 129
See application file for complete search history.

(56) References Cited

U.S. PATENT DOCUMENTS

| | | | | |
|---|---|---|---|---|
| 9,094,101 | B2* | 7/2015 | Li | H04B 1/44 |
| 9,699,516 | B2* | 7/2017 | Li | H04N 21/6118 |
| 2006/0205442 | A1* | 9/2006 | Phillips | H03F 3/191 |
| | | | | 455/572 |
| 2007/0261094 | A1* | 11/2007 | Urbanek | H04N 7/17327 |
| | | | | 725/127 |
| 2013/0133019 | A1 | 5/2013 | Montena et al. | |
| 2013/0227632 | A1 | 8/2013 | Wells et al. | |

OTHER PUBLICATIONS

Agnes Wittmann-Regis (Authorized Officer), International Preliminary Report on Patentability dated Jan. 10, 2019, PCT Application No. PCT/US2017/040234, filed Jun. 30, 2017, pp. 1-10.

* cited by examiner

US 10,448,089 B2

LOW NOISE NETWORK INTERFACE DEVICE

FIELD

The present disclosure is directed to cable television (CATV) network communication devices. More particularly, the present disclosure relates to an entry adapter for a CATV network.

BACKGROUND

CATV networks supply and distribute high frequency "downstream" signals from a main signal distribution facility, known as a "headend," to premises (e.g., homes and offices) of subscribers. The downstream signals can be provided to subscriber equipment, such as televisions, telephones, and computers. In addition, most CATV networks also receive "upstream" signals from subscriber equipment back to the headend of the CATV network. For example, a set top box can send an upstream signal including information for selecting programs for viewing on a television. Also, upstream and downstream signals are used by personal computers connected through the CATV infrastructure to the Internet. Further, voice over Internet protocol (VOIP) telephones use upstream and downstream signals to communicate telephone conversations.

To permit simultaneous communication of upstream and downstream signals, and to permit interoperability of subscriber equipment and equipment associated with the CATV network infrastructure, the downstream and upstream signals are confined to two different frequency bands. For example, in CATV networks, the downstream frequency band can be within a range of about 54 to 1002 megahertz (MHz) and the upstream frequency band can be within a range of about 5 to 42 MHz.

Downstream signals can be delivered from infrastructure of the CATV network to the subscriber premises via a network interface device (which may also be referred to as an entry device, an entry adapter, a terminal adapter, or a drop amplifier). A network interface device can be a multiport device, in which an upstream entry port connects to a drop cable from the infrastructure of the CATV network, and one or more input/output ports (hereinafter "ports") connect to subscriber equipment distributed around a premises of a subscriber.

The network interface device can include two paths: an active signal communication path and a passive signal communication path. The active signal communication path can include active components (e.g., powered devices) that amplify and/or condition downstream signals received from the CATV infrastructure and conduct them to one or more ports of the CATV entry adapter. Subscriber equipment connected to these active ports benefit from this amplification of the CATV downstream signal. However, the loss of power to the entry adapter prevents communication of active CATV signals by the active components. Additionally, one or more of the ports can be connected to the passive signal communication path, which lacks any active components. As such, subscriber equipment connected to these passive ports can operate in the event of power loss. For example, the passive signal communication path may be used to provide a "lifeline telephone service" that remains operative when a subscriber premises losses power.

SUMMARY

Embodiments in accordance with the present disclosure provide network interface device, including an entry port, a passive input/output port, an active input/output port, a downstream directional coupler, an upstream directional coupler, a downstream amplifier, and an upstream amplifier. An input port of the downstream directional coupler receives a downstream radio-frequency (RF) signal from the entry port. A through port of the downstream directional coupler provides a majority portion of a downstream RF signal to the active input/output port via the downstream amplifier. A coupled port of the downstream directional coupler provides a minority portion of the downstream RF signal to passive input/output port. A through port of the upstream directional coupler provide a first upstream RF signal from the passive input/output port to the entry port. A coupled port of the upstream directional coupler provides a second upstream RF signal from the active input/output port to the entry port via the upstream amplifier.

Additionally, embodiments in accordance with the present disclosure provide a network interface device, including an active downstream radio-frequency (RF) signal path having a downstream amplifier, and connecting an entry port to an active input/output port via a through port of a downstream directional coupler. The device also includes a passive downstream RF signal path connecting the entry port to a passive port via a coupled port of the downstream direction coupler. The downstream directional coupler minimizes the pre-amplifier passive losses and thus the noise figure of the downstream RF signal provided the active input/output port.

Moreover, embodiments in accordance with the present disclosure provide a network interface device, including an active downstream radio-frequency (RF) signal path having a directional coupler and passing a downstream RF signal received from an entry port to an input/output port via an active downstream RF signal path with reduced attenuation by the directional coupler. The device also includes a passive downstream RF signal path having the directional coupler, and passing the downstream RF signal to a second input/output port with increased attention by the directional coupler and without any amplification.

DETAILED DESCRIPTION

Network interface devices in accordance with aspects of the present disclosure minimize pre-amplifier signal losses of radio frequency (RF) transmissions and decrease signal path noise. Implementations consistent with those disclosed herein minimize a noise figure of a network interface deice by reducing signal loss before amplifiers in an active signal paths, while allowing greater signal loss in passive signal paths. The noise figure can be a ratio of actual amount noise (in decibels) output by a signal path to an amount of noise that which would remain if the network interface device itself did not introduce noise.

Figure 1:
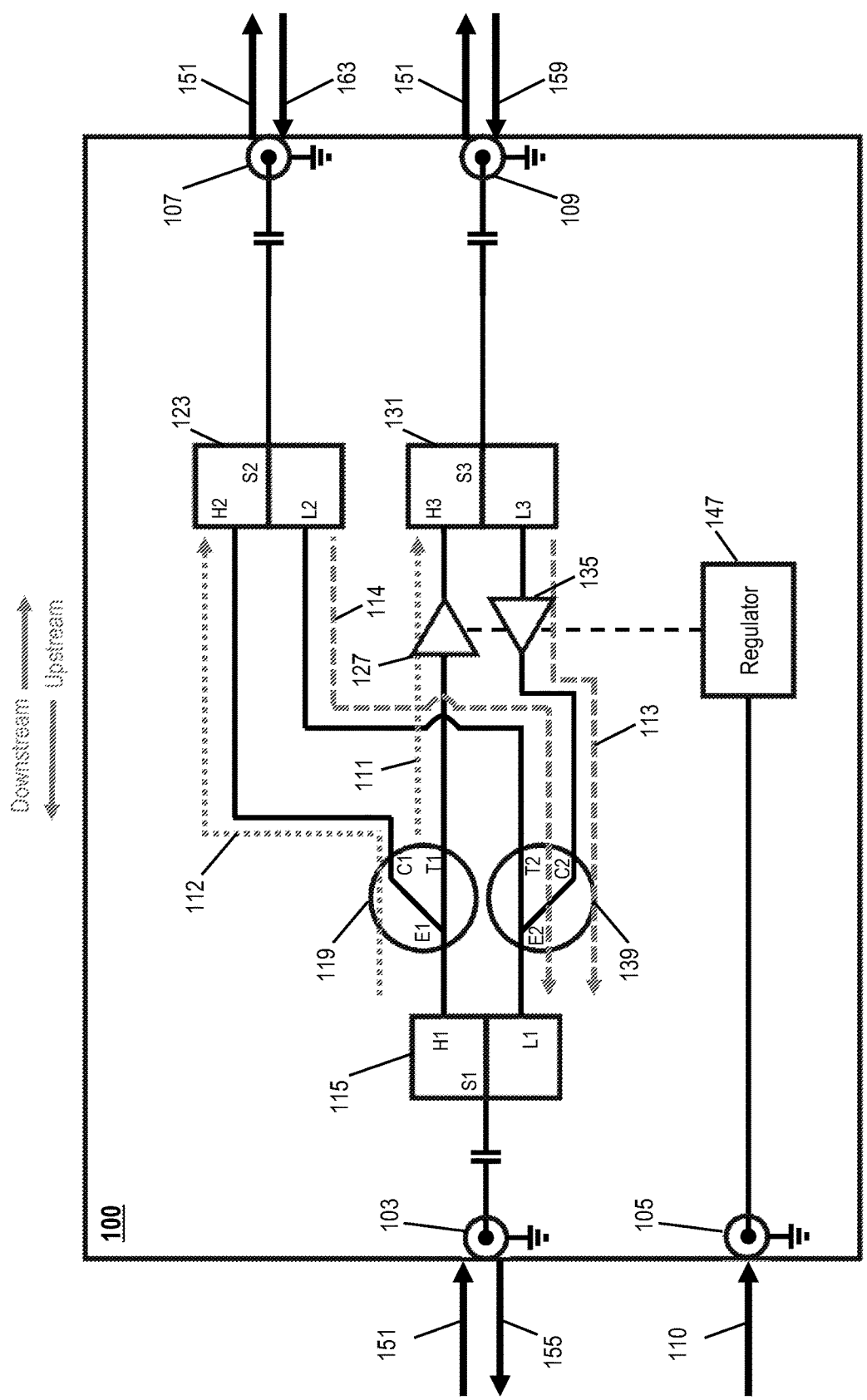
FIG. 1 is a functional block diagram of an exemplary network interface device in accordance with aspects of the present disclosure.

FIG. 1 is a functional block diagram of an exemplary network interface device 100 consistent with the present disclosure. The network interface device 100 includes an entry port 103, a power input port 105, a passive port 107, and an active port 111. The entry port 103 can receive downstream RF signals 151 from a service provider, such as a CATV provider (e.g., via a drop line). The entry port 103 can also transmit upstream RF signals 155 to the service provider. The power input port 105 receives power 110 from an external source for powering various devices within the network interface device 100. For example, the network interface device 100 may be powered by an AC/DC adapter that receives power from a residence (for example, 100-230 volts AC, 50/60 Hz). The passive port 107 and the active port 109 communicate RF signals 151, 163 and 151. 159 between the network interface device 100 and subscriber equipment. The subscriber equipment can be, for example, CATV, Internet, VoIP, and/or data communication devices installed at the residence.

In accordance with aspects of the present disclosure, the network interface device 100 includes an active downstream signal path 111, a passive downstream signal path 112, an active upstream signal path 113, and a passive upstream signal path 114. The active downstream signal path 111 is indicated in FIG. 1 by a dotted line between the entry port 103 and the passive port 107. The passive upstream signal path 114 is indicated by a dashed line between the entry port 103 and the passive port 107. The active upstream signal path 113 is indicated by dashed line between the active port 109 and the entry port. The passive upstream signal path 114 is indicated by a dashed line between passive port 107 and the entry port 103.

The active downstream signal path 111 includes a diplexer 115, a first downstream directional coupler 119, a downstream amplifier 127, and a diplexer 131. In accordance with aspects of the present disclosure, the network interface device 100 can receive the downstream RF signal 151 at the entry port 103 from the infrastructure of a service provider (e.g., a CATV network). A common terminal (S1) of the diplexer 115 can receive the downstream RF signal 151 as an input. The diplexer 115 passes the high-frequency signal (e.g., a 54 to 1002 MHz CATV signal) and, via a high terminal (H1), provides the downstream RF signal 151 as an input to the downstream directional coupler 119. The downstream directional coupler 119 includes an input port (E1), a through port (T1), and a coupled port (C1). In implementations, the downstream directional coupler passes RF signals between the input port and the through port without substantial attenuation, while substantially attenuating RF signals passed between the input port and the coupled port. As such, the input port (E1) passes a majority of the power of the downstream RF signal 151 through to the through port (T1), while passing a minority of such power to the coupled port (C1). For example, the downstream directional coupler 119 can attenuate the downstream RF signal 151 by less than one decibel (dB) between the input port (E1) and the through port (T1). In comparison, the downstream directional coupler 119 can attenuate the signal by over 6 dB between the input port (E1) and the coupled port (C1). Thereby, embodiments of the network interface device 100 minimizes the noise figure of the downstream RF signal 151 in the active downstream signal path 111. Next, an input of the downstream amplifier 127 receives the output from through port (T1) of the downstream directional coupler 119 and amplifies the signal. The downstream amplifier 127 then outputs the downstream RF signal 151 to a high terminal (H3) of the diplexer 131, which passes it to the active port 109 for provision to subscriber equipment. Because the directional coupler 119 splits the downstream RF signal 151 prior to the amplifier 127, and provides a majority of the power of the to the amplifier 127, the lowest loss of power in the active downstream signal path 111 occurs before the downstream RF signal 151 is input to the amplifier 127. Accordingly, noise figure of the active downstream signal path 111 is minimized.

Referring now to the passive downstream signal path 112, the diplexer 115 outputs the downstream RF signal 151 as an input to the downstream directional coupler 119, as described above. The coupled port (C1) of the downstream directional coupler 119 outputs a portion of the downstream RF signal 151 to a high terminal (H2) of the diplexer 123. For example, as described previously herein, the attenuation at the coupled port (C1) can be 6 dB or more. However, because the downstream RF signal 151 is in the passive downstream signal path 112, such attenuation does not affect the signal-to-noise ratio of the downstream RF signal 151. Next, common terminal (S2) the diplexer 123 passes the downstream RF signal 151 to the passive port 107 or provision to passive subscriber equipment, such as a VOIP telephone.

Referring now to the active upstream signal path 113, the network interface device 100 receives an upstream RF signal 159 at the active port 109 from, e.g., subscriber equipment. A common terminal (S3) of the diplexer 131 can receive the upstream RF signal 159 as an input. The diplexer 131 filters the signal to remove frequencies greater than a predefined threshold (e.g., about 45-50 MHz, such as CATV downstream frequency band). Via a low terminal (L3) of the diplexer 131, the upstream RF signal 159 is provided as an input to upstream amplifier 135. The upstream amplifier 135 amplifies the upstream RF signal 159 and outputs it to coupled port (C2) of the upstream directional coupler 139. As described previously, the coupled port (C2) of the upstream directional coupler 139 attenuates the active upstream RF signal 159. However, because the upstream directional coupler 139 is connected at the output of the upstream amplifier 135, the upstream amplifier 135 can compensate for the power lost through the coupled port (C2) without substantially affecting the noise factor of the upstream RF signal 159. The upstream directional coupler 139 then outputs the upstream RF signal 159 via the input port (E1), which is connected to a low terminal (L1) of the diplexer 115. The diplexer 115 outputs the upstream RF signal 159 to the entry port 103 via the common port (S1) of the diplexer 115.

Referring now to the passive upstream signal path 114, the network interface device 100 receives an upstream RF signal 163 at the passive port 107 from, e.g., VOIP equipment. The common terminal (S2) of the diplexer 123 can receive the upstream RF signal 163 as an input. The diplexer 123 filters signals as described previously herein, and, via a low terminal (L2), provides the upstream RF signal 163 to the through port (T2) of the upstream directional coupler 139. The low terminal (L1) of the diplexer 115 then receives the upstream RF signal 163 from the input port (E1) of the upstream directional coupler 139 and outputs it to the entry port 103 for transmission to the infrastructure of a service provider. As noted above, signals incur minimal attenuation via through port (T2) (e.g., less the one or two dB). Thus, in accordance with aspects of the present disclosure, power loss of the upstream RF signal 163 from the passive port 107 is minimized when passing through upstream directional coupler 139. Accordingly, in the event that the upstream amplifier 135 in the passive downstream signal path 112 become inactive due to a loss of power (e.g., interruption of power 110 from power input port 105) the power of the upstream RF signal 163 for, e.g., lifeline telephone service is maximized in the passive upstream signal path 114.

Figure 2:
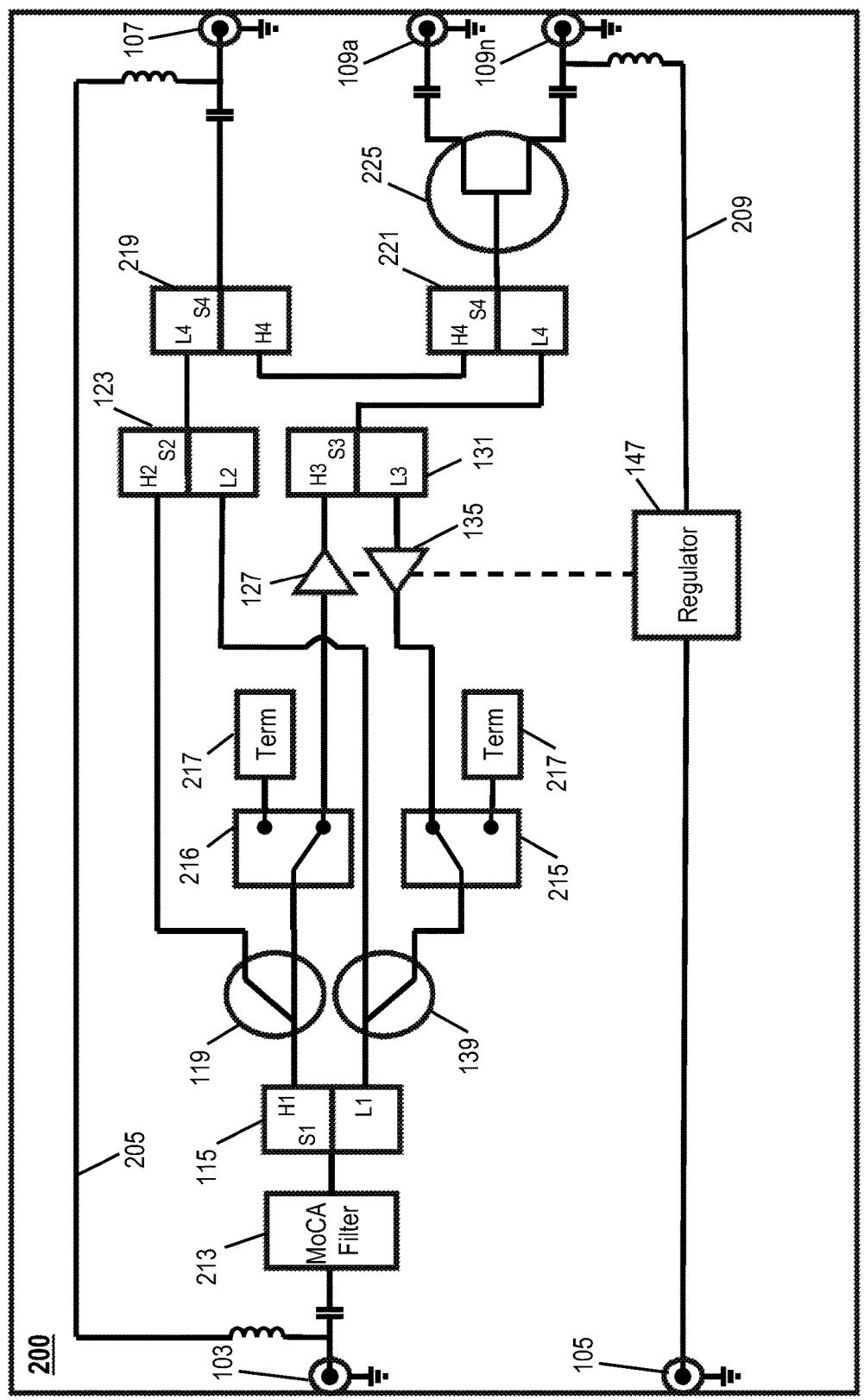
FIG. 2 is a functional block diagram of an exemplary network interface device in accordance with aspects of the present disclosure.

FIG. 2 is a functional block diagram of a network interface device 200 in accordance with aspects of the present disclosure. The network interface device 200 includes an entry port 103, a power input port 105, a passive port 107, active ports 109a . . . 109n, a diplexer 115, a downstream directional coupler 119, a diplexer 123, a downstream amplifier 127, a diplexer 131, an upstream amplifier 135, and a upstream directional coupler 139, which can be the same or similar to those previously described herein. Additionally, embodiments of the network interface device 200 include a power passing path 205, a remote power connection 209, an upstream relay 215, a downstream relay 216, a diplexer 219, a diplexer 221, and an n-way splitter 225. Further, embodiments of the network interface device can include a Multimedia over Coax Alliance (MoCA) point of entry filter 213 and terminators 217.

The power passing path 205 allows inline power that may be provided by an input signal to be transmitted between ports 103 and 107. Similarly, remote power connection 209 can provide power from the regulator 147 to the active port 109n. The MoCA filter 213 prevents the potential leakage of subscriber information including in MoCA signals transmitted among MoCA-enabled subscriber equipment. For example, the MoCA filter 213 can filter frequencies above about 1125 MHz that may otherwise leak out the entry port 103. The diplexers 219 and 221 can be configured to separate high-frequency MoCA signals received via ports 107 and ports 109a . . . 109n, and pass the between such ports. Accordingly, MoCA-enabled equipment connected to passive port 107 can communicate with MoCA enabled devices connected to active ports 109a . . . 109n. Additionally, the diplexers 219 and 221 separate low-frequency (CATV) upstream RF signals and pass them to the entry port 103 in a similar manner to that previously describe herein.

The n-way splitter 225 (e.g. power divider) divides a downstream signal (e.g., downstream RF signal 151), where it is distributed to ports 109a . . . 109n. In the upstream direction, broadband signals (e.g., 54-1002 MHz) can be received from subscriber devices in communication with active ports 109a . . . 109n. Such broadband signal can include, for example, upstream RF signals (e.g., CATV signals in a range of 5-42 MHz) and the MoCA RF signals (e.g., 1125-1675 MHz). The n-way splitter 225 can receive the broadband signals at terminals connected respectively to the ports 109a . . . 109n, which combine them into a composite upstream RF signal. Then, as previously described above, the diplexer 221 can separate the high-frequency MoCA signals received via active ports 109a . . . 109n, and pass them to passive port 107. Additionally, the diplexer 221 can separate the composite upstream RF signal (e.g., upstream RF signal 159) and pass it to the entry port 103 via the upstream relay 215, the directional coupler 139, diplexer 115, and the MoCA filter 213. Accordingly, the network interface device 200 can bidirectionally connect with a number (n) of subscriber equipment devices with the entry port 103.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What we claim is:

1. A network interface device, comprising:
   an entry port;
   a passive input/output port;
   an active input/output port;
   a downstream directional coupler connected to the entry port;
   an upstream directional coupler connected to the entry port;
   a downstream relay connected to the downstream directional coupler;
   an upstream relay connected to the upstream directional coupler;
   a downstream terminator connected to the downstream relay;
   an upstream terminator connected to the upstream relay;
   a downstream amplifier connected to the downstream relay;
   an upstream amplifier connected to the upstream relay; and
   a multimedia over coax alliance (MoCA) filter connected to the entry port, the downstream directional coupler, and the upstream directional coupler,
   wherein:
      an input port of the downstream directional coupler is configured to receive a downstream radio-frequency (RF) signal from the entry port;
      a through port of the downstream directional coupler is configured to provide a majority portion of the downstream RF signal to the active input/output port via the downstream amplifier;
      a coupled port of the downstream directional coupler is configured to provide a minority portion of the downstream RF signal to the passive input/output port;
      a through port of the upstream directional coupler is configured to provide a first upstream RF signal from the passive input/output port to the entry port;
      a coupled port of the upstream directional coupler is configured to provide a second upstream RF signal from the active input/output port to the entry port via the upstream amplifier; and
      the MoCA filter is configured to block at least a portion of the first upstream RF signal, the second upstream RF signal, or both from leaking out of the entry port.

2. The network interface device of claim 1, wherein the downstream directional coupler is configured to minimize a noise figure of the downstream RF signal provided the active input/output port.

3. The network interface device of claim 2, wherein the noise figure comprises a ratio of an actual amount of noise of the downstream RF signal to an amount of noise that would remain if the network interface device did not introduce noise.

4. The network interface device of claim 1, wherein the upstream amplifier is configured to amplify the second upstream RF signal provided to the coupled port of the upstream directional coupler.

5. The network interface device of claim 1, wherein:
   the input port of the downstream directional coupler and the coupled port of the downstream directional coupler are configured to provide at least a portion of the passive signal path between the entry port and the passive input/output port; and
   the passive signal path lacks any active devices.

6. The network interface device of claim 1, wherein:
   the through port of the upstream directional coupler and the input port of the upstream directional coupler are configured to provide at least a portion of the passive signal path between the entry port and the passive input/output port; and
   the passive signal path lacks any active devices.

7. The network interface device of claim 1, wherein the MoCA filter is downstream from the entry port and upstream from the downstream and upstream directional couplers.

8. The network interface device of claim 1, wherein at least a portion of the first upstream RF signal, the second upstream RF signal, or both have a frequency greater than or equal to 1125 megahertz (MHz).

9. The network interface device of claim 8, further comprising a diplexer configured to pass the portion of the first upstream RF signal and the second upstream RF signal, having the frequency greater than or equal to about 1125 MHz, between the passive input/output port and the active input/output port.

10. The network interface device of claim 8, further comprising a diplexer configured to pass a portion of the first upstream RF signal and the second upstream RF signal, having a frequency less than or equal to about 1125 MHz, toward the entry port.

11. The network interface device of claim 1, wherein the downstream directional coupler, the downstream relay, the downstream terminator, the upstream directional coupler, the upstream relay, and the upstream terminator preserve a passive signal path between the entry port and the passive input/output port by terminating an active signal path between the entry port and the active input/output port when the active signal path experiences a loss of power or a power fault condition.

12. A network interface device, comprising:
    an active downstream radio-frequency (RF) signal path including:
       a downstream directional coupler;
       a downstream relay connected to the downstream directional coupler;
       a downstream terminator connected to the downstream relay; and
       a downstream amplifier connected to the downstream relay,
       wherein the active downstream RF signal path is configured to connect an entry port to an active input/output port via a through port of the downstream directional coupler;
    an active upstream RF signal path including:
       an upstream directional coupler;
       an upstream relay connected to the upstream directional coupler;
       an upstream terminator connected to the upstream relay; and
       an upstream amplifier connected to the upstream relay;
    a passive downstream RF signal path configured to connect the entry port to a passive input/output port via a coupled port of the downstream direction coupler; and a multimedia over coax alliance (MoCA) filter configured to block at least a portion of an upstream RF signal from leaking out of the entry port,
wherein the downstream directional coupler is configured to minimize a noise figure of a downstream RF signal provided to the active input/output port.

13. The network interface device of claim 12, wherein the active upstream RF signal path is configured to connect the active input/output port to the entry port via a coupled port of the upstream directional coupler.

14. The network interface device of claim 13, wherein the active upstream RF signal path comprises the upstream amplifier, the coupled port of the upstream directional coupler, and the second input port of the upstream directional coupler.

15. The network interface device of claim 13, wherein the coupled port of the upstream direction coupler is configured to substantially attenuate the upstream RF signal output by the upstream amplifier.

16. The network interface device of claim 13, wherein the second through port of the upstream direction coupler is configured to receive the upstream RF signal from the passive input/output port.

17. The network interface device of claim 12, further comprising a passive upstream RF signal path configured to connect the passive input/output port to the entry port via a through port of the upstream directional coupler.

18. The network interface device of claim 17, wherein the passive upstream RF signal path comprises the second through port of the upstream directional coupler and the second input port of the upstream directional coupler.

19. The network interface device of claim 12, wherein the active downstream RF signal path comprises the input port of the downstream directional coupler, the through port of the downstream directional coupler, and the downstream amplifier.

20. The network interface device of claim 12, wherein the coupled port of the downstream directional coupler is configured to substantially attenuate the downstream RF signal.

21. The network interface device of claim 12, wherein the passive downstream RF signal path and the passive upstream RF signal path include only non-active devices.

22. The network interface device of claim 12, wherein the noise figure comprises a ratio of an actual amount of noise of the downstream RF signal to an amount of noise that would remain if the network interface device did not introduce noise.

23. A network interface device, comprising:
an active downstream radio-frequency (RF) signal path including:
a downstream directional coupler;
a downstream relay connected to the downstream directional coupler;
a downstream terminator connected to the downstream relay; and
a downstream amplifier connected to the downstream relay,
wherein the active downstream RF signal path is configured to pass a downstream RF signal received from an entry port to a first input/output port without substantial attenuation by the downstream directional coupler;
an active upstream RF signal path including:
an upstream directional coupler;
an upstream relay connected to the upstream directional coupler;
an upstream terminator connected to the upstream relay; and
an upstream amplifier connected to the upstream relay;
a passive downstream RF signal path including the downstream directional coupler and configured to pass the downstream RF signal to a second input/output port with substantial attention by the downstream directional coupler and without any amplification; and
a multimedia over coax alliance (MoCA) filter configured to block at least a portion of an upstream RF signal from leaking out of the entry port.

24. The network interface device of claim 23, wherein the active downstream RF signal path is configured to minimize a noise figure of the downstream RF signal provided to the first input/output port.

25. The network interface device of claim 24, wherein the noise figure comprises a ratio of an actual amount of noise of the downstream RF signal to an amount of noise that would remain if the network interface device did not introduce noise.

26. The network interface device of claim 23, wherein the active downstream RF signal path comprises an input port of the downstream directional coupler, a through port of the downstream directional coupler, and the downstream amplifier.

27. The network interface device of claim 23, wherein the passive downstream RF signal path comprises an input port of the downstream directional coupler and a coupled port of the downstream directional coupler.

28. The network interface device of claim 23, wherein the upstream RF signal comprises a first upstream RF signal, a second upstream RF signal, or both, and further comprising:
the active upstream RF signal path configured to pass the first upstream RF signal received from the first input/output port to the entry port with substantial attenuation by the upstream directional coupler and with amplification by the upstream amplifier; and
a passive upstream RF signal path including the upstream directional coupler and configured to pass the second upstream RF signal received from the second input/output port to the entry port without any amplification.

29. A network interface device, comprising:
an active downstream radio-frequency (RF) signal path that includes:
a downstream directional coupler;
a downstream relay connected to the downstream directional coupler;
a downstream terminator connected to the downstream relay; and
a downstream amplifier connected to the downstream relay,
wherein the active downstream RF signal path is configured to pass a downstream RF signal received from an entry port to a first input/output port;
an active upstream RF signal path that includes:
an upstream directional coupler;
an upstream relay connected to the upstream directional coupler;
an upstream terminator connected to the upstream relay; and
an upstream amplifier connected to the upstream relay;
a passive downstream RF signal path that includes the downstream directional coupler and is configured to pass the downstream RF signal to a second input/output port; and
a multimedia over coax alliance (MoCA) filter that is configured to minimize noise by filtering at least a portion of an upstream RF signal so as to prevent the portion of the upstream signal from leaking out of the entry port.

30. The network interface device of claim 29, wherein the active downstream RF signal path is configured to pass the downstream RF signal received from the entry port to the first input/output port without substantial attenuation by the downstream directional coupler, and wherein the passive downstream RF signal path is configured to pass the downstream RF signal to the second input/output port with substantial attention by the downstream directional coupler and without any amplification.

31. The network interface device of claim 29, wherein the portion of the upstream RF signal has a frequency greater than or equal to 1125 megahertz (MHz).

32. The network interface device of claim 31, further comprising:
   a first diplexer that is configured to pass the portion of the upstream RF signal, having the frequency greater than or equal to about 1125 MHz, between the first input/output port and the second input/output port; and
   a second diplexer that is configured to pass a portion of the upstream RF signal, having a frequency less than or equal to about 1125 MHz, toward the entry port.

33. A network interface device, comprising:
   an active downstream radio-frequency (RF) signal path that includes:
      a first directional coupler;
      a first relay connected to the first directional coupler;
      a first terminator connected to the first relay; and
      a first amplifier connected to the first relay,
      wherein the active downstream RF signal path is configured to pass a downstream RF signal received from an entry port to a first input/output port;
   a passive downstream RF signal path that includes the first directional coupler and is configured to pass the downstream RF signal to a second input/output port; and
   an upstream RF signal path that includes:
      a second directional coupler;
      a second relay connected to the second directional coupler;
      a second terminator connected to the second relay; and
      a second amplifier connected to the second relay,
      wherein the upstream RF signal path is configured to pass an upstream RF signal having a frequency greater than or equal to 1125 megahertz (MHz).

34. The network interface device of claim 33, wherein the upstream RF signal path comprises:
   an active upstream RF signal path that includes the second directional coupler and is configured to pass the upstream RF signal received from the first input/output port toward the entry port; and
   a passive upstream RF signal path that includes the second directional coupler and is configured to pass the upstream RF signal received from the second input/output port toward the entry port.

35. The network interface device of claim 33, further comprising:
   a first diplexer that is configured to pass a portion of the upstream RF signal, having the frequency greater than or equal to about 1125 MHz, between the first input/output port and the second input/output port; and
   a second diplexer that is configured to pass a portion of the upstream RF signal, having a frequency less than or equal to about 1125 MHz, toward the entry port.

* * * * *